United States Patent
Fujibe et al.

(10) Patent No.: US 8,451,034 B2
(45) Date of Patent: May 28, 2013

(54) CLOCK HAND-OFF CIRCUIT

(75) Inventors: Tasuku Fujibe, Tokyo (JP); Masakatsu Suda, Tokyo (JP)

(73) Assignee: Advantest Corporation, Tokyo (JP)

(*) Notice: Subject to any disclaimer, the term of this patent is extended or adjusted under 35 U.S.C. 154(b) by 164 days.

(21) Appl. No.: 13/055,203

(22) PCT Filed: Jul. 25, 2008

(86) PCT No.: PCT/JP2008/001995
§ 371 (c)(1),
(2), (4) Date: Jan. 21, 2011

(87) PCT Pub. No.: WO2010/010603
PCT Pub. Date: Jan. 28, 2010

(65) Prior Publication Data
US 2011/0128052 A1   Jun. 2, 2011

(51) Int. Cl.
*H03L 7/00* (2006.01)

(52) U.S. Cl.
USPC .......................................... 327/144; 327/141

(58) Field of Classification Search
USPC .......................................... 327/141, 144, 145
See application file for complete search history.

(56) References Cited

U.S. PATENT DOCUMENTS

| | | | | |
|---|---|---|---|---|
| 5,748,018 A | * | 5/1998 | Ishikawa | 327/154 |
| 5,905,391 A | * | 5/1999 | Mooney | 327/161 |
| 5,923,193 A | * | 7/1999 | Bloch et al. | 327/141 |
| 5,987,081 A | * | 11/1999 | Csoppenszky et al. | 375/354 |
| 6,009,131 A | | 12/1999 | Hiramatsu | 375/354 |
| 6,664,827 B2 | * | 12/2003 | O'Leary et al. | 327/156 |
| 6,987,404 B2 | * | 1/2006 | Duncan | 327/144 |
| 8,212,594 B2 | * | 7/2012 | Singhal et al. | 327/144 |

FOREIGN PATENT DOCUMENTS

| | | |
|---|---|---|
| CN | 1116340 A | 2/1996 |
| CN | 101135920 A | 3/2008 |
| JP | 2-76332 A | 3/1990 |
| JP | 08-065173 | 3/1996 |
| JP | 8-65173 A | 3/1996 |
| JP | 9-93232 A | 4/1997 |
| JP | 2002-9629 A | 1/2002 |
| JP | 2004-297703 A | 10/2004 |

OTHER PUBLICATIONS

Office Action issued for corr. Korean Patent App. No. 10-2011-7004154 dated Mar. 21, 2012 with its English translation.
PCT International Search Report and Written Opinion issued in PCT Application No. PCT/JP2008/001995 and mailed on Oct. 28, 2008, with English-language translations.
PCT International Preliminary Report on Patentability issued in PCT/J2008/001995 and mailed on Feb. 3, 2011.
Office Action issued on Oct. 25, 2011 for corresponding Japanese Patent Application No. 2010-521546 with its English translation.
Office Action for related Taiwanese patent application No. 098124884, issued on Nov. 16, 2012 and an English tranlsation.
Office Action for related Chinese patent application No. 200880130172.3, issued on Feb. 7, 2013 and an English translation.

* cited by examiner

*Primary Examiner* — Hai L Nguyen
(74) *Attorney, Agent, or Firm* — Ladas & Parry, LLP

(57) ABSTRACT

A second latch latches the output data of a first latch using a third clock having the same frequency as that of a first clock. A third latch latches the output data of the second latch using a second clock having a frequency N (N represents an integer) times that of the first clock and the third clock. The second clock and the third clock have a frequency division/multiplication relation therebetween.

14 Claims, 8 Drawing Sheets

CLOCK HAND-OFF CIRCUIT

CROSS REFERENCE TO RELATED APPLICATIONS

This application is the U.S. National Stage of International Patent Application No. PCT/JP2008/001995 filed on Jul. 25, 2008 and claims priority thereto, the disclosure of which is hereby incorporated by reference in its entirety.

BACKGROUND OF THE INVENTION

1. Field of the Invention

The present invention relates to a data transmission technique for transmitting data between different clock domains.

2. Description of the Related Art

A test apparatus is employed in which a test pattern is supplied to a semiconductor device which is a device under test (which will be referred to as the "DUT" hereafter) so as to test the operation thereof, thereby judging the quality thereof. FIG. 1 is a block diagram which shows a configuration of a test apparatus.

A test apparatus 100 mounts a pattern generator (PG) 2 configured to generate a test pattern to be supplied to a DUT 200, and a timing generator (TG) 4 configured to define the timing at which the test pattern is supplied to the DUT 200.

The timing generator 4 is packaged as a combination of a logic circuit 12 and a high-precision circuit 14. In order to improve the package density, in many cases, these circuits are integrated on a single semiconductor substrate. However, the logic circuit 12 has a problem of a large amount of switching noise. Such switching noise has an effect on the high-precision circuit 14, resulting in degraded timing precision. In order to suppress such an effect, the logic circuit 12 and the high-precision circuit 14 have separate respective power supplies 1a and 1b. Furthermore, the logic circuit 12 and the high-precision circuit 14 have separate respective distribution paths for reference clocks (which will simply be referred to as the "clocks" hereafter) LREFCK and HREFCLK.

The logic circuit 12 operates in synchronization with the clock LREFCK, and transmits data that is in synchronization with the clock LREFCK to the high-precision circuit 14. The high-precision circuit 14 includes a fine delay circuit (not shown). The high-precision circuit is configured to set a delay amount according to the data received from the logic circuit 12 so as to supply data to the DUT 200 at a timing specified by the user.

The logic circuit 12 operates at the clock LREFCK, which is a relatively low-speed clock, e.g., 286 MHz. In addition, the high-precision circuit 14 uses a high-speed clock HREFCK, e.g., a 2.28 GHz clock that is obtained by multiplying the 286 MHz clock by 8. FIG. 2 is a block diagram which shows the relation between the logic circuit 12 and the high-precision circuit 14. A multiplexer 16 is arranged between the logic circuit 12 and the high-precision circuit 14. By using such a clock obtained by multiplying a given clock by N (N represents an integer), such an arrangement allows multiple logic circuits to be connected in parallel with a single high-precision circuit. Thus, such an arrangement provides an operation which is equivalent to the operation of an arrangement in which the logic circuit 12 operates at a frequency N times the frequency that is actually applied to the logic circuit 12.

The two clocks LREFCK and HREFCK are each generated using a clock obtained by a single oscillator as a reference clock, and thus although the periods of these two clocks are proportional to each other, the phases of the clocks are not necessarily consistent. Furthermore, the phase relation between these clocks fluctuates due to irregularities in the process or the like. Accordingly, in a case in which a high-speed clock is employed, such fluctuation in the phase relation approaches the period of the clock, leading to a problem in that such an arrangement does not ensure normal operation. Thus, such an arrangement requires an adjustment unit which enables the high-precision circuit 14 to receive the data output from the logic circuit 12 side with high precision.

In conventional arrangements, in order to solve such a problem, a FIFO (First In First Out) circuit is provided between the logic circuit 12 and the high-precision circuit 14. However, as the operation frequency used in the high-precision circuit 14 becomes higher, it becomes difficult to mount a complicated and large-scale logic circuit such as a FIFO. Furthermore, in a case in which a frequency multiplying circuit having a multiplication factor of N operates with a free-running clock, such an arrangement cannot set the start phase of the FIFO at a desired position, leading to a problem in that a normal operation state cannot be established.

SUMMARY OF THE INVENTION

The present invention has been made in order to solve such a problem. Accordingly, it is a general purpose of the present invention to provide a technique for transmitting data between different clock domains with high precision.

An embodiment of the present invention relates to a clock hand-off circuit. The clock hand-off circuit comprises: a first latch configured to latch input data using a first clock; a second latch configured to latch output data of the first latch using a third clock having the same frequency as that of the first clock; and a third latch configured to latch output data of the second latch using a second clock having a frequency that is N (N represents an integer) times the frequency of the first clock and the third clock. With such an arrangement, there is a frequency multiplication/division relation between the second clock and the third clock.

The term "frequency division/multiplication relation" as used here represents a relation in which one frequency is generated using another frequency as a reference, i.e., one frequency is generated by dividing or multiplying another frequency.

With such an embodiment, the input data is handed off from the first clock to the second clock via two steps, i.e., a step from the first clock to the third clock, and a step from the third clock to the second clock. The phase synchronization relation between the second clock and the third clock is essentially maintained. Thus, such an arrangement is capable of handing off the data from one clock to another clock in a sure manner as long as the phase difference between the first clock and the third clock satisfies a predetermined relation.

Another embodiment of the present invention also relates to a clock hand-off circuit. The clock hand-off circuit comprises: a first latch configured to latch input data using a first clock; a frequency dividing circuit configured to generate a third clock by dividing the frequency of a second clock having a frequency that is N times that of the first clock; a second latch configured to latch output data of the first latch using the third clock; and a third latch configured to latch output data of the second latch using the second clock.

Such an arrangement is also capable of handing off the data from one clock to another clock in a sure manner as long as the phase difference between the first clock and the third clock satisfies a predetermined relation.

Also, a clock hand-off circuit according to an embodiment may further comprise a frequency multiplying circuit configured to generate the second clock by multiplying the frequency of the first clock by N (N represents an integer).

Also, an arrangement may be made in which the phase of the third clock obtained by dividing the frequency of the second clock can be adjusted in increments of the period of the second clock. Such an embodiment is capable of adjusting the timing of the third clock so as to satisfy the set-up conditions and the hold conditions with respect to the second latch.

Also, a clock hand-off circuit according to an embodiment may further comprise a counter configured to count the time difference between an edge timing of the third clock and an edge timing of the input data using the second clock.

With such an arrangement, the count value of the counter represents the timing of the third clock with respect to the input data. Thus, based upon the count value thus obtained, such an arrangement is capable of optimizing the phase of the third clock so as to satisfy the set-up condition and the hold condition.

Also, the phase of the third clock may be adjusted such that the count value of the counter is within a predetermined range.

With an embodiment, the phase of the third clock may be initialized by repeatedly performing the following steps while sweeping the phase of the third clock.

1: applying a predetermined pattern as the input data for each phase.

2: reading out the count value of the counter after the pattern is applied.

3: judging whether or not the count value thus read out is within the predetermined range.

With another embodiment, the phase of the third clock may be initialized by performing the following steps.

1: setting the phase of the third clock to a predetermined initial value.

2: applying a predetermined pattern as the input data for the phase thus set.

3: reading out the count value of the counter after the pattern is applied.

4: setting the phase of the third clock to a predetermined first value when the count value thus read out is greater than an upper limit value of the predetermined range, and setting the phase of the third clock to a predetermined second value when the count value is smaller than a lower limit value of the predetermined range.

With such embodiments, the phase of the third clock can be suitably initialized.

Yet another embodiment of the present invention relates to a test apparatus. The test apparatus comprises: an oscillator configured to generate a first clock; and a clock hand-off circuit according to any one of the aforementioned embodiments, configured to receive input data that is in synchronization with the first clock, and to hand off the input data to the second clock.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
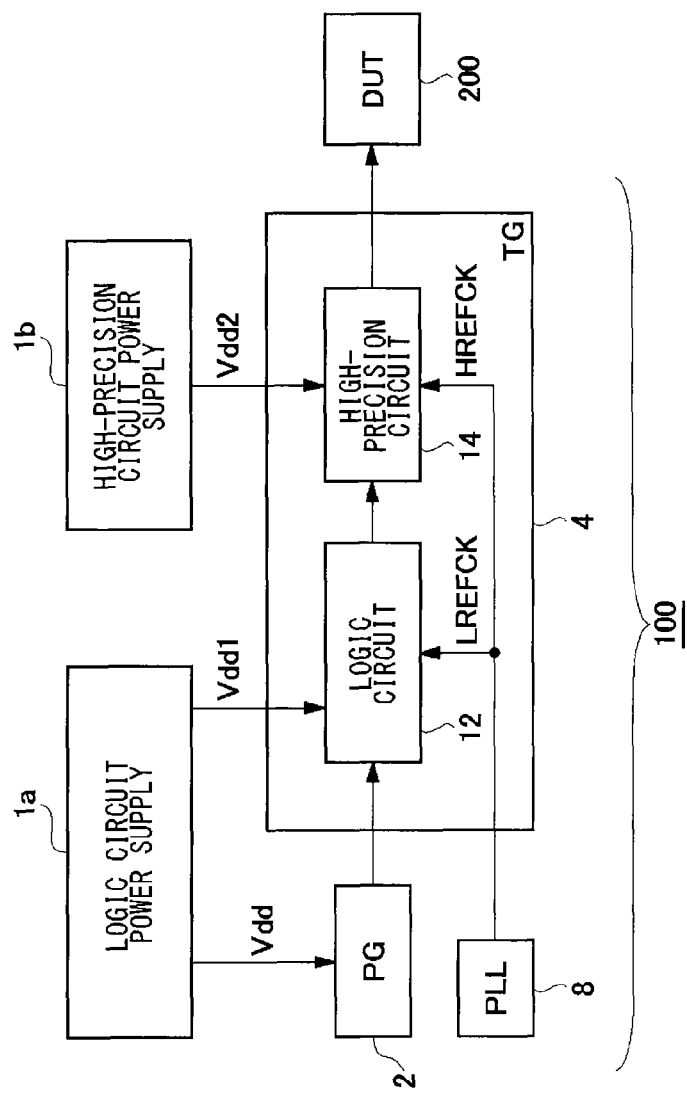
FIG. 1 is a block diagram which shows a configuration of a test apparatus.
Figure 2:
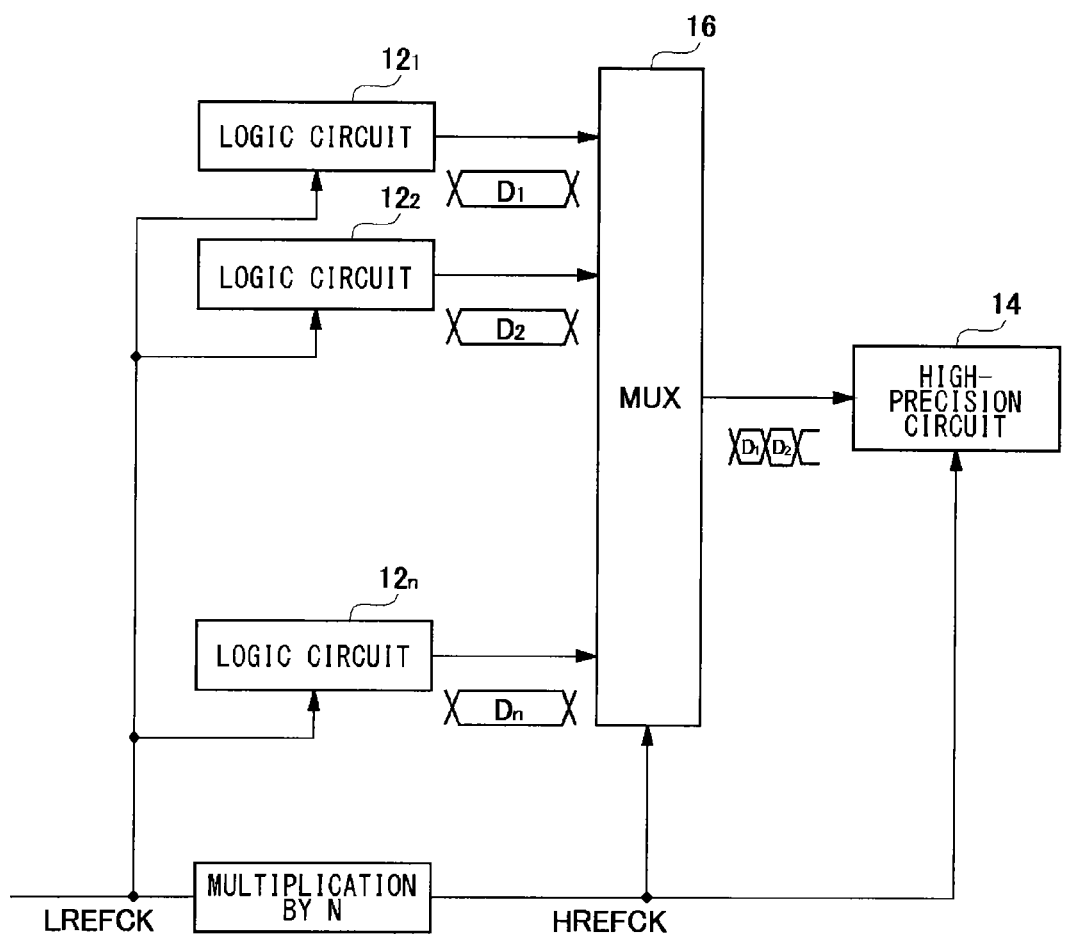
FIG. 2 is a block diagram which shows a relation between a logic circuit and a high-precision circuit.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 3:
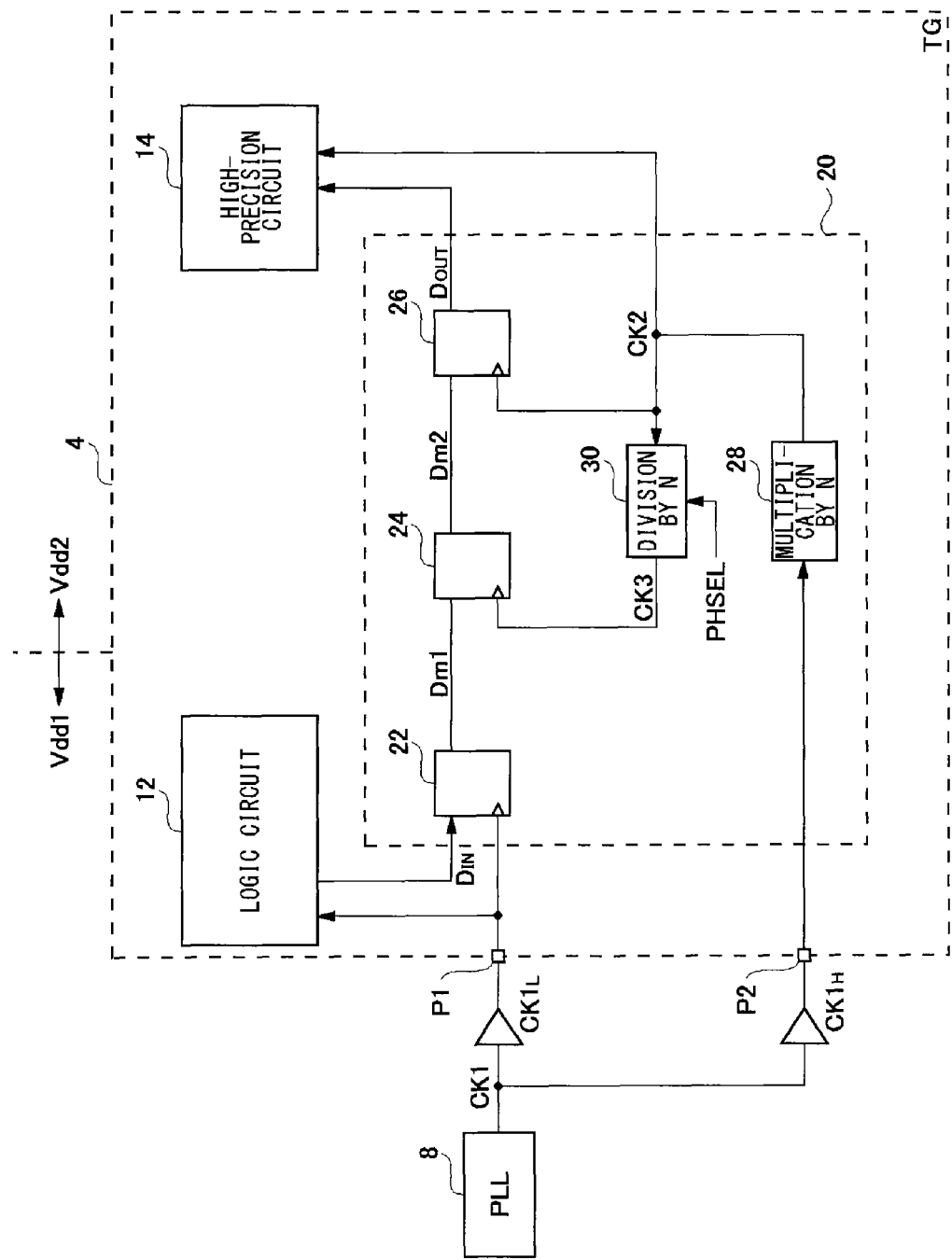
FIG. 3 is a circuit diagram which shows a configuration of a timing generator mounting a clock hand-off circuit according to an embodiment.

FIG. 3 is a circuit diagram which shows a configuration of a timing generator 4 mounting a clock hand-off circuit 20 according to an embodiment. The timing generator 4 includes a logic circuit 12, a high-precision circuit 14, and a clock hand-off circuit 20, which are monolithically integrated on a single semiconductor substrate. As described above with reference to FIG. 1, the logic circuit 12 and the high-precision circuit 14 operate while receiving different respective power supply voltages Vdd1 and Vdd2. A clock generator 8 is configured as a PLL circuit, for example, and outputs a first clock CK1 at a first frequency f1. The timing generator 4 receives the clock to be used by the logic circuit 12 and the clock to be used on the high-precision circuit 14 side via separate clock terminals P1 and P2, respectively. The first clock CK1 is divided into one clock $CLK1_L$ that is supplied to the logic circuit 12 via a clock terminal P1, and another clock $CLK1_H$ that is supplied to the high-precision circuit 14 via a clock terminal P2.

The logic circuit 12 generates input data $D_{IN}$ in synchronization with the first clock $CK1_L$ having a first frequency f1 output from the clock generator 8. The clock hand-off circuit 20 hands off the input data $D_{IN}$ that is in synchronization with the first clock $CLK1_L$ to the second clock CK2, which has a second frequency f2, which is N times the first frequency f1. The high-precision circuit 14 receives the output data $D_{OUT}$ output from the clock hand-off circuit 20, and operates in synchronization with the second clock CK2. Description will be made regarding an arrangement in which N=8 for simplicity of description. However, N can be determined as desired, and is not restricted in particular.

The above is the overall configuration of the timing generator 4. Next, description will be made regarding the clock hand-off circuit 20.

The clock hand-off circuit 20 includes a first latch 22, a second latch 24, a third latch 26, a frequency multiplying circuit 28, and a frequency dividing circuit 30.

The first latch 22 latches the input data $D_{IN}$ using the first clock $CK1_L$. The second latch 24 latches the output data (first intermediate data Dm1) of the first latch 22 using a third clock CK3 having the same frequency as that of the first clock $CK1_L$.

The third latch 26 latches the output data (second intermediate data Dm2) of the second latch 24 using the second clock CK2 having the frequency f2, which is N times (N represents an integer) the frequency of the first clock CK1 and the third clock CK3.

There is a reciprocal frequency division/multiplication relation between the second clock CK2 and the third clock CK3. For example, the second clock CK2 may be generated by multiplying the third clock CK3 by N. Conversely, the third clock CK3 may be generated by dividing the second clock CK2 by N. In the present embodiment, the latter method is employed.

The input data $D_{IN}$ is handed off from the clock $CK1_L$ to the clock CK2 via two steps, i.e., a step from the first clock $CK1_L$ to the third clock CK3, and a step from the third clock CK3 to the second clock CK2. An essentially synchronous phase relation is maintained between the second clock CK2 and the third clock CK3, which have a frequency division/multiplication relation. Thus, with the clock hand-off circuit 20 shown in FIG. 3, the downstream components of the second latch 24 operate in synchronization with each other as long as the phase difference between the first clock $CK1_L$ and the third clock CK3 satisfies a predetermined relation. Thus, such an arrangement hands off data from one clock to another clock in a sure manner.

Next, description will be made regarding the relation between the clocks shown in FIG. 3.

The frequency dividing circuit 30 divides, by N, the second clock CK2 having the second frequency f2, which is N times the frequency of the first clock CK1, thereby generating the third clock CK3. The frequency multiplying circuit 28 multiplies the first clock $CK1_H$ by N, thereby generating the second clock CK2.

Figure 4:
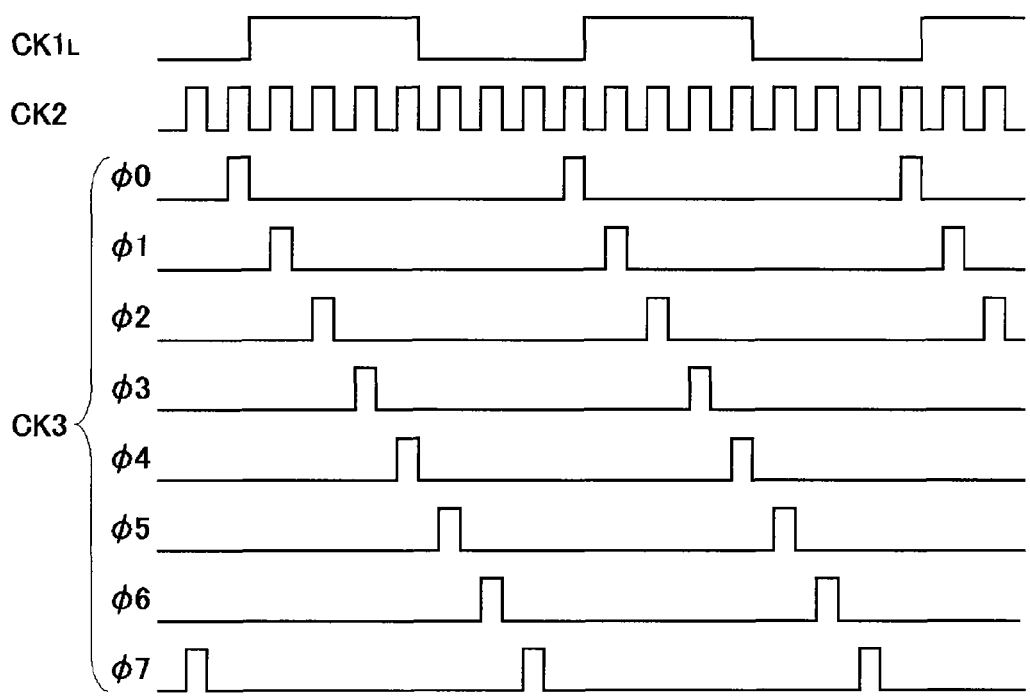
FIG. 4 is a time chart which shows the operation of the clock hand-off circuit shown in FIG. 3.

The above is the configuration of the clock hand-off circuit 20. FIG. 4 is a time chart which shows the operation of the clock hand-off circuit 20 shown in FIG. 3.

Instead of using the first clock $CK1_H$ without change as the third clock CK3, by generating the third clock CK3 by dividing the frequency of the second clock CK2, such an arrangement is capable of adjusting the phase of the third clock CK3 in increments of the period of the second clock CK2 (1/f2). This is why such an arrangement in which the frequency of the second clock CK2 is divided by N is capable of selecting one of N phases φ0 through φ7. Of the third clocks CK3 (φ0 to φ7) having eight respective phases each obtained by dividing the frequency of the second clock CK2 shown in FIG. 4 by 8, one clock is selected according to a phase selection signal PHSEL (=0 to 7), and the third clock CK3 thus selected is supplied to the second latch 24.

Next, description will be made regarding an optimization method for optimizing the phase of the third clock CK3 and a circuit configuration for implementing the optimization method.

Figure 5:
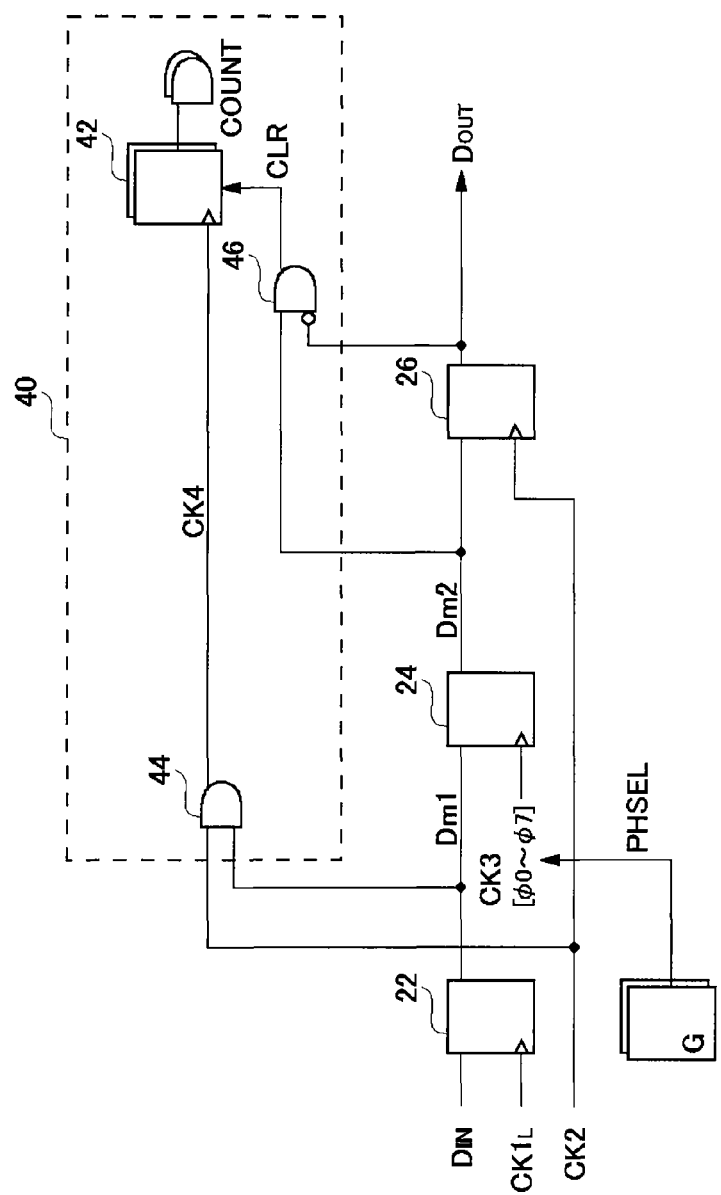
FIG. 5 is a circuit diagram which shows a configuration of a phase adjustment circuit configured to control the phase φ of a third clock CK.

FIG. 5 is a circuit diagram which shows a configuration of a phase adjustment circuit 40 configured to control the phase φ of the third clock CK3. The phase adjustment circuit 40 includes a counter 42, an AND gate 44, and an AND gate 46.

The counter 42 counts, using the second clock CK2, the time difference between the edge timing of the third clock CK3 and the edge timing of the first intermediate data Dm1 received from the first latch 22. The counter 42 may measure the time difference between a positive edge of the first intermediate data Dm1 and an edge of the third clock CK3. Also, the counter 42 may measure the time difference between a negative edge of the first intermediate data Dm1 and an edge of the third clock CK3. The phase adjustment circuit 40 shown in FIG. 5 is configured so as to optimize the phase of the third clock CK3 based upon the latter method.

The AND gate 44 masks the second clock CK2 using the first intermediate data Dm1. The clock CK4 thus masked is supplied to the counter 42. The counter 42 counts the clock CK4 thus received.

The AND gate 46 generates the logical AND of the second intermediate data Dm2 received from the second latch 24 and the inversion of the output data $D_{OUT}$. The count value COUNT held by the counter 42 is initialized according to a clear signal CLR output from the AND gate 46.

Figure 6:
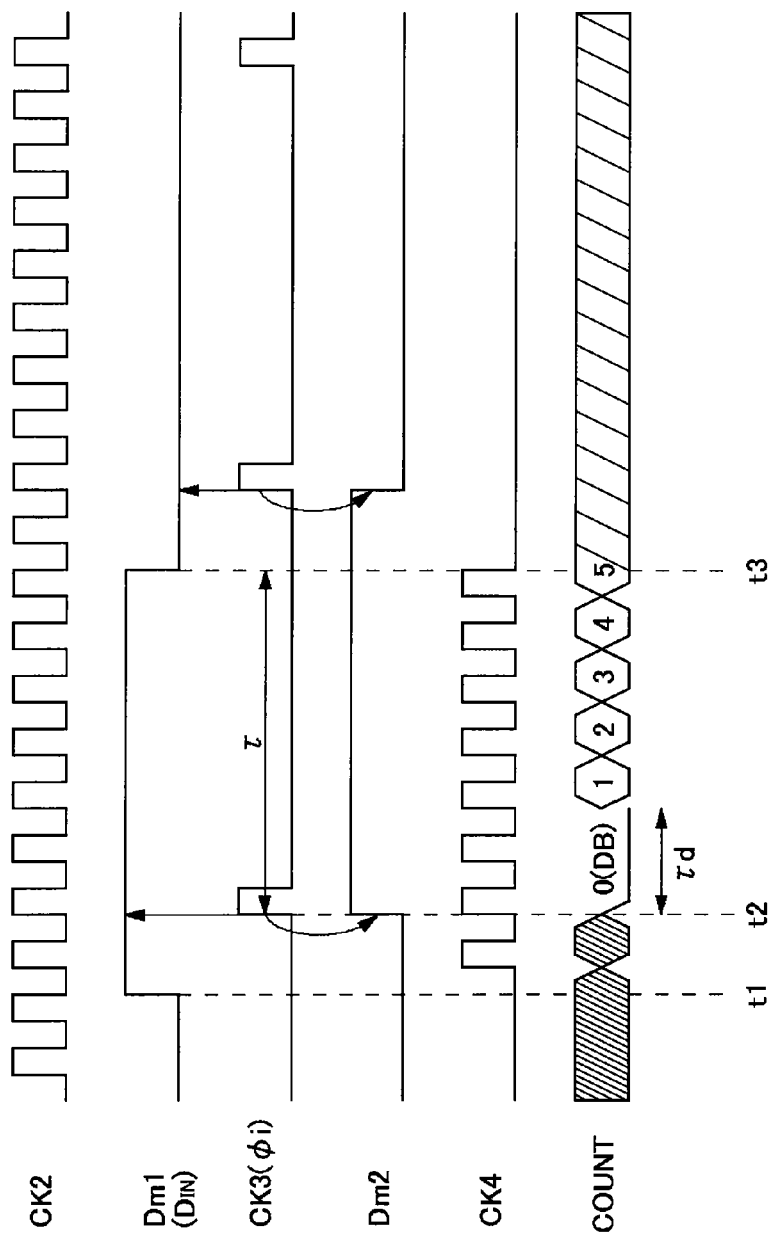
FIG. 6 is a time chart which shows the operation of the phase adjustment circuit shown in FIG. 5.

FIG. 6 is a time chart which shows the operation of the phase adjustment circuit 40 shown in FIG. 5. In a step in which the phase is adjusted, a predetermined pattern is input as the input data $D_{IN}$. In the time chart shown in FIG. 6, the input data $D_{IN}$ is shown as a pattern in which the level is switched in the order low level, high level, low level. The first intermediate data Dm1 output from the first latch 22 is switched in the order low level, high level, low level, according to the input data $D_{IN}$.

When the first intermediate data Dm1 is switched to high level at the time point t1, the AND gate 44 releases the second clock CK2 from being cut off, and accordingly, the second clock CK2 is output to the counter 42. In this stage, the counter 42 starts the count operation.

With the i-th phase (0≦i<N) clock selected as the third clock CK3, the first intermediate data Dm1 is latched at a positive edge of the i-th phase clock thus selected, thereby generating the second intermediate data Dm2. When the second intermediate data Dm2 is switched to high level at the time point t2, the clear signal CLR output from the AND gate 46 is asserted, thereby resetting to zero the count value of the counter 42. Subsequently, the count value of the counter 42 is counted up in increments of 1 per pulse. It should be noted that the counter 42 has a period (dead band DB) in which the counter cannot provide an effective count operation immediately after the clear operation. Accordingly, a certain number of pulses are not counted immediately after the clear operation. In the time chart shown in FIG. 6, the dead band τd occurs for a period of two clocks.

At the time point t3, the first intermediate data Dm1 is switched to low level according to the transition of the input data $D_{IN}$. In this state, the AND gate 44 cuts off the second clock CK2, and accordingly, the clock CK4 is not supplied to the counter 42, thereby stopping the counting operation of the counter 42. The counter 42 holds the count value COUNT until the clear signal CLR is asserted when new input data $D_{IN}$ is supplied. That is to say, with such an arrangement, the count value COUNT is held regardless of the states of the first clock $CK1_L$ and $CK1_H$. Thus, such an arrangement has the advantage that there is no need to stop these clocks in a step for optimizing the phase.

The resulting count value COUNT of the counter 42 represents a value that corresponds to a period of time t from an edge timing (t2) of the third clock CK3 until a timing (t3) of a negative edge of the first intermediate data Dm1. The period of time τ is represented by the following Expression using the period T2 (=1/f2) of the second clock CK2.

$$\tau = \tau d + COUNT \times T2$$

In a case in which the dead band of the counter 42 is negligibly small, the count value COUNT is represented by the Expression τ=COUNT×T2.

As the phase of the third clock CK3 advances, the count value COUNT becomes larger. Conversely, as the phase of the third clock CK3 is delayed, the count value COUNT becomes smaller. Thus, by selecting the phase of the third clock CK3 such that the count value COUNT is within a predetermined range, such an arrangement is capable of optimizing the edge timing of the third clock CK3 so as to satisfy the set-up conditions and the hold conditions with respect to the second latch 24, and specifically by optimizing the edge timing of the third clock CK3 to be in the vicinity of the center of the unit interval of the first intermediate data Dm1. In the time chart shown in FIG. 6, the optimal edge timing corresponds to when the count value COUNT is from 2 to 4.

The operation for optimizing the phase of the third clock CK3 can be executed according to the following procedure.

First Procedure

Figure 7:
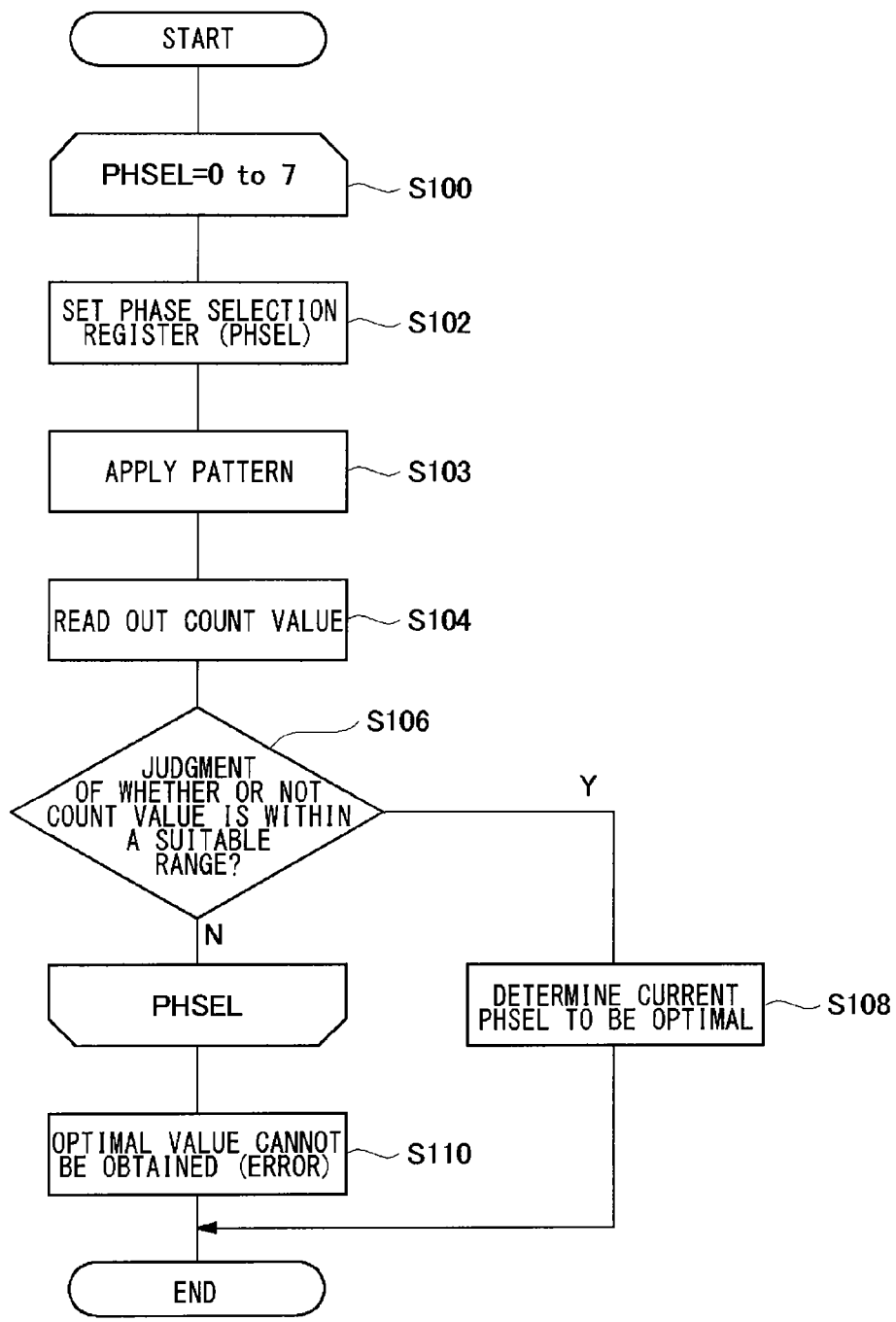
FIG. 7 is a flow chart which shows a first procedure for performing phase optimization by means of the phase adjustment circuit.

FIG. 7 is a flow chart which shows the first procedure for performing phase optimization by means of the phase adjustment circuit 40.

In the optimization operation, the following steps are executed while incrementing the value of the variable PHSEL from 0 to 7 in increments of 1 (S100).

The variable PHSEL is set to i (0≦i<N), thereby setting the phase of the third clock CK3 to ϕi (S102). Subsequently, a predetermined pattern is applied as the input data $D_{IN}$ (S103), following which the count value of the counter 42 is read out (S104). When the count value COUNT is within an optimal range ("YES" in S106), the current variable PHSEL is determined to be optimal (S108), and the optimization operation ends.

When the count value COUNT is outside the optimal range ("NO" in S106), the variable PHSEL is incremented, the flow returns to Step S102, and the same processing is repeatedly performed.

With the processing shown in the flow chart in FIG. 7, such an arrangement provides a third clock CK3 having an optimal phase by performing the aforementioned processing at most N times. Furthermore, such an arrangement holds the count value COUNT until a new pattern is input. Accordingly, such an arrangement does not require a control operation for stopping and restarting the reference clock CK1. Thus, such an arrangement does not require a wait time for waiting for the stable state of the circuit, thereby providing a high-speed initializing operation.

Second Procedure

Figure 8:
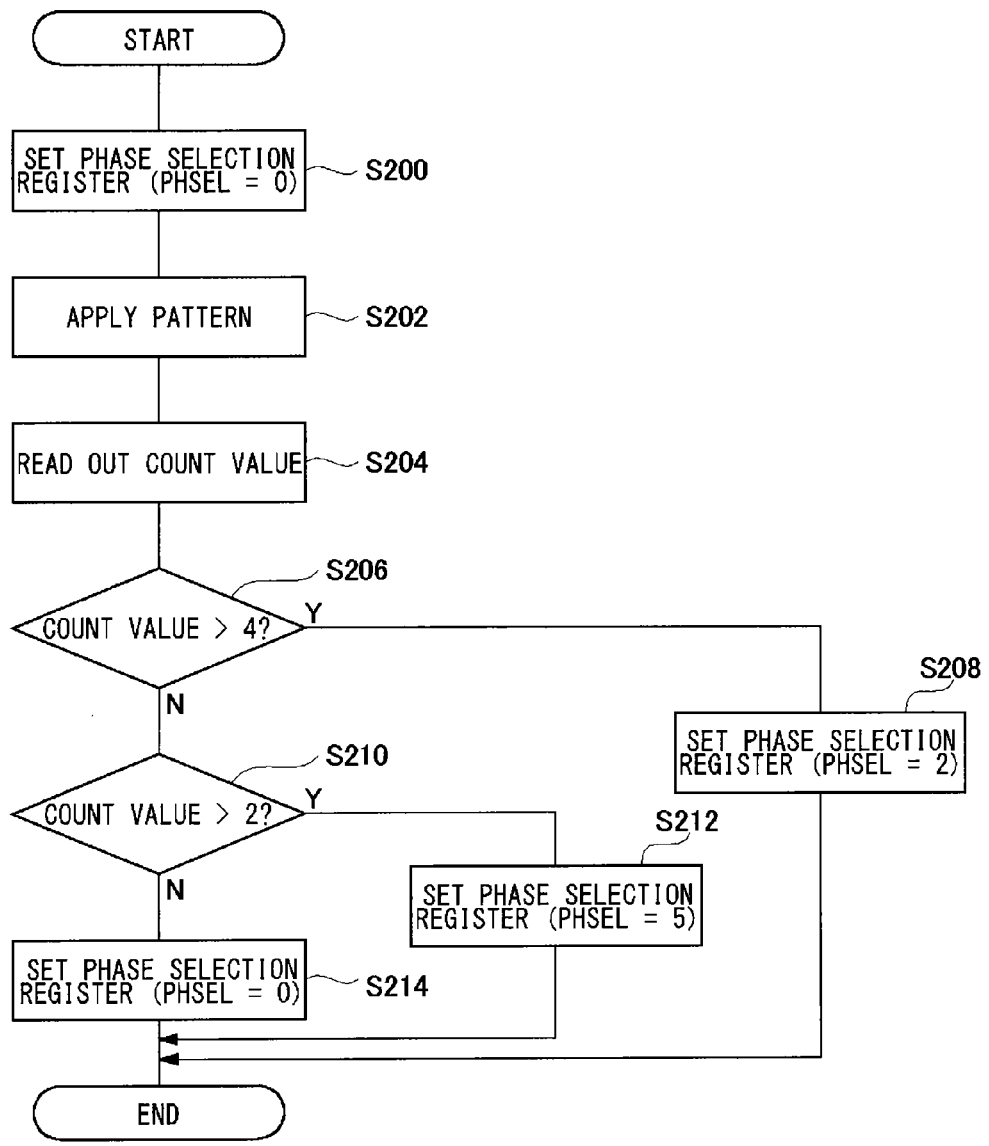
FIG. 8 is a flow chart which shows a second procedure for performing phase optimization by means of the phase adjustment circuit.

FIG. 8 is a flow chart which shows the second procedure for performing the phase optimization by means of the phase adjustment circuit 40.

First, the value of the variable PHSEL is set to a initial value (=0), thereby setting the phase of the third clock CK3 to ϕ0 (S200). The initial value INIT is not restricted to 0.

Subsequently, a predetermined pattern is applied as the input data $D_{IN}$ (S200), following which the count value COUNT of the counter 42 is read out (S204). When the count value COUNT is lower than the upper limit value H (=4) of the optimal range ("NO" in S206), and the count value COUNT is smaller than the lower limit L (=2) of the optimal range ("NO" in S210), the variable PHSEL is set to the initial value, and the optimization operation ends.

In Step S206, a case in which the count value COUNT is greater than the upper limit H (=4) ("YES" in S206) means that the edge timing of the third clock CK3 is earlier than the optimal edge timing. Thus, in this case, the variable PHSEL is set to a first value X (=2) which differs from the initial value INIT (S208). The first value is set to a value which is greater than the initial value by a predetermined value (e.g., 2). As a result, the timing of the third clock CK3 is shifted backward by a period of two cycles, thereby optimizing the timing of the third clock CK3.

In Step S120, a case in which the count value COUNT is smaller than the lower limit H (=2) ("YES" in S210) means that the edge timing of the third clock CK3 is later than the optimal edge timing. Accordingly, in order to shift the timing of the third clock CK3 forward, the value of the variable PHSEL is set to a second value Y (=5) that differs from the initial value (S212). As a result, the third clock CK3 is shifted back so as to straddle the current cycle, thereby setting the timing of the third clock CK3 to be earlier than that in the initial state.

With the second procedure, such an arrangement can optimize the phase of the third clock CK3 by applying a pattern only once.

Description has been made regarding the present invention with reference to the embodiments. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A test apparatus comprising:
    an oscillator configured to generate a first clock; and
    a clock hand-off circuit configured to receive input data that is in synchronization with the first clock, and to hand off the input data to the second clock;
    wherein the clock hand-off circuit comprises:
    a first latch configured to latch input data using a first clock;
    a frequency dividing circuit configured to divide a frequency of a second clock to generate a third clock, the frequency of the second clock being N times that of the first clock, where N represents an integer;
    a second latch configured to latch output data of the first latch using the third clock;
    a third latch configured to latch output data of the second latch using the second clock; and
    a frequency multiplying circuit configured to generate the second clock by multiplying the frequency of the first clock by N;
    wherein the phase of the third clock obtained by dividing the frequency of the second clock can be adjusted in increments of the period of the second clock.

2. A test apparatus comprising:
an oscillator configured to generate a first clock; and
a clock hand-off circuit configured to receive input data that is in synchronization with the first clock, and to hand off the input data to the second clock;
wherein the clock hand-off circuit comprises:
a first latch configured to latch input data using a first clock;
a frequency dividing circuit configured to divide a frequency of a second clock to generate a third clock, the frequency of the second clock being N times that of the first clock, where N represents an integer;
a second latch configured to latch output data of the first latch using the third clock;
a third latch configured to latch output data of the second latch using the second clock;
wherein the phase of the third clock obtained by dividing the frequency of the second clock can be adjusted in increments of the period of the second clock.

3. A clock hand-off circuit comprising:
a first latch configured to latch input data using a first clock;
a frequency dividing circuit configured to divide a frequency of a second clock to generate a third clock, the frequency of the second clock being N times that of the first clock, where N represents an integer;
a second latch configured to latch output data of the first latch using the third clock;
a third latch configured to latch output data of the second latch using the second clock; and
a frequency multiplying circuit configured to generate the second clock by multiplying the frequency of the first clock by N.

4. A clock hand-off circuit comprising:
a first latch configured to latch input data using a first clock;
a frequency dividing circuit configured to divide a frequency of a second clock to generate a third clock, the frequency of the second clock being N times that of the first clock, where N represents an integer;
a second latch configured to latch output data of the first latch using the third clock;
a third latch configured to latch output data of the second latch using the second clock;
wherein the phase of the third clock obtained by dividing the frequency of the second clock can be adjusted in increments of the period of the second clock.

5. The clock hand-off circuit according to claim 4, further comprising a counter configured to count the time difference between an edge timing of the third clock and an edge timing of the output data of the first latch using the second clock.

6. The clock hand-off circuit according to claim 5, wherein the phase of the third clock is adjusted such that the count value of the counter is within a predetermined range.

7. The clock hand-off circuit according to claim 6, wherein the phase of the third clock is initialized by repeatedly performing a procedure while sweeping the phase of the third clock, the procedure comprising:
applying a predetermined pattern as the input data for each phase;
reading out the count value of the counter after the pattern is applied; and
judging whether or not the count value thus read out is within the predetermined range.

8. The clock hand-off circuit according to claim 6, wherein the phase of the third clock is initialized by performing a procedure, the procedure comprising:
setting the phase of the third clock to a predetermined initial value;
applying a predetermined pattern as the input data for the phase thus set;
reading out the count value of the counter after the pattern is applied; and
setting the phase of the third clock to a first value that differs from the initial value when the count value thus read out is greater than an upper limit value of the predetermined range, and setting the phase of the third clock to a second value that differs from the initial value when the count value is smaller than a lower limit value of the predetermined range.

9. A test apparatus comprising:
an oscillator configured to generate a first clock; and
a clock hand-off circuit configured to receive input data that is in synchronization with the first clock, and to hand off the input data to the second clock;
wherein the clock hand-off circuit comprises:
a first latch configured to latch input data using a first clock;
a frequency dividing circuit configured to divide a frequency of a second clock to generate a third clock, the frequency of the second clock being N times that of the first clock, where N represents an integer;
a second latch configured to latch output data of the first latch using the third clock;
a third latch configured to latch output data of the second latch using the second clock; and
a frequency multiplying circuit configured to generate the second clock by multiplying the frequency of the first clock by N.

10. A clock hand-off circuit comprising:
a first latch configured to latch input data using a first clock;
a frequency dividing circuit configured to divide a frequency of a second clock to generate a third clock, the frequency of the second clock being N times that of the first clock, where N represents an integer;
a second latch configured to latch output data of the first latch using the third clock;
a third latch configured to latch output data of the second latch using the second clock; and
a frequency multiplying circuit configured to generate the second clock by multiplying the frequency of the first clock by N;
wherein the phase of the third clock obtained by dividing the frequency of the second clock can be adjusted in increments of the period of the second clock.

11. The clock hand-off circuit according to claim 10, further comprising a counter configured to count the time difference between an edge timing of the third clock and an edge timing of the output data of the first latch using the second clock.

12. The clock hand-off circuit according to claim 11, wherein the phase of the third clock is adjusted such that the count value of the counter is within a predetermined range.

13. The clock hand-off circuit according to claim 12, wherein the phase of the third clock is initialized by repeatedly performing a procedure while sweeping the phase of the third clock, the procedure comprising:
applying a predetermined pattern as the input data for each phase;
reading out the count value of the counter after the pattern is applied; and
judging whether or not the count value thus read out is within the predetermined range.

14. The clock hand-off circuit according to claim 12, wherein the phase of the third clock is initialized by performing a procedure, the procedure comprising:

setting the phase of the third clock to a predetermined initial value;

applying a predetermined pattern as the input data for the phase thus set;

reading out the count value of the counter after the pattern is applied; and setting the phase of the third clock to a first value that differs from the initial value when the count value thus read out is greater than an upper limit value of the predetermined range, and setting the phase of the third clock to a second value that differs from the initial value when the count value is smaller than a lower limit value of the predetermined range.

* * * * *